No. 678,813. Patented July 16, 1901.
A. H. RIGGS.
NUT TAPPING MACHINE.
(Application filed Nov. 15, 1900.)
(No Model.)
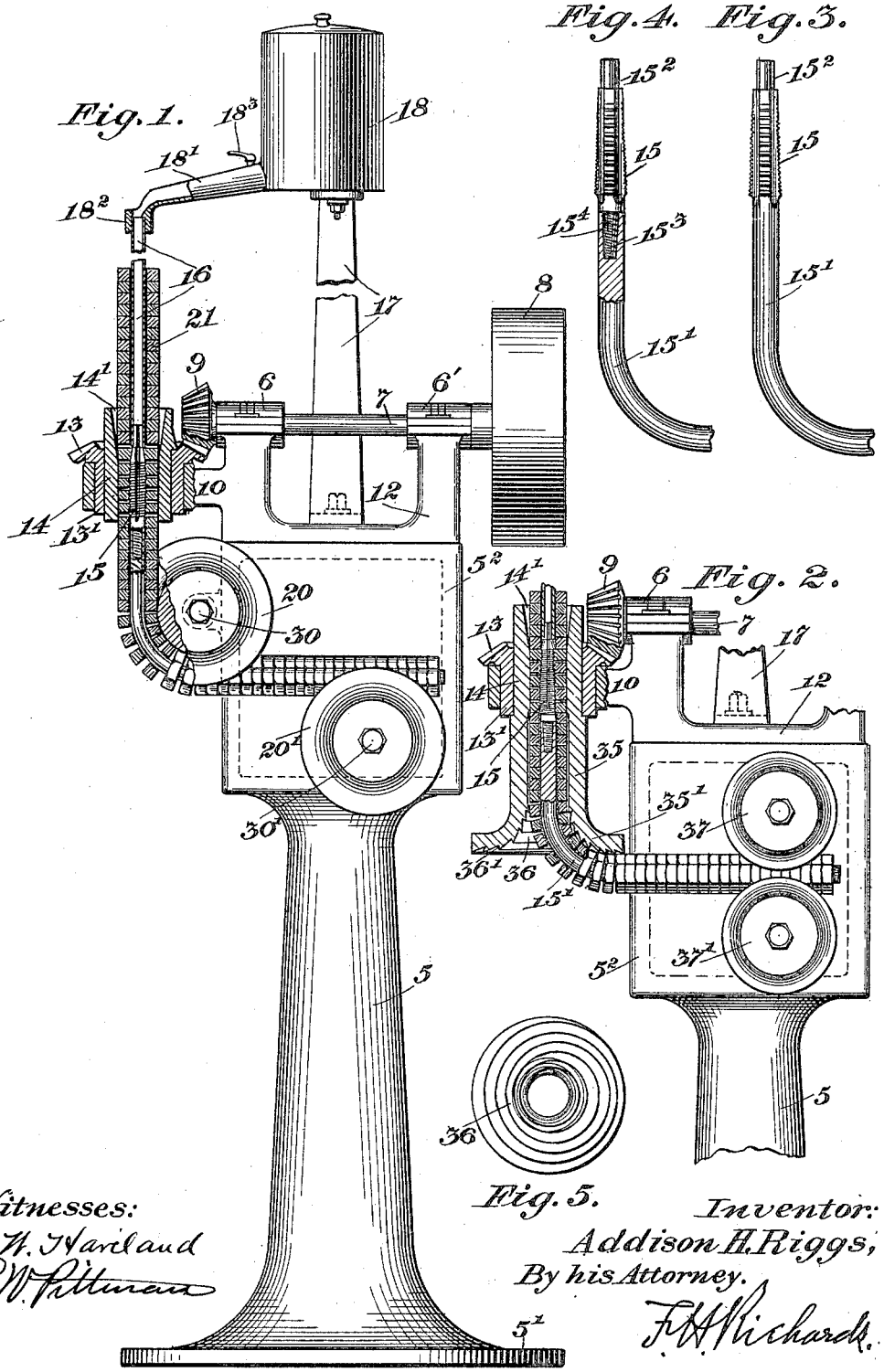
Witnesses:
F. H. Haviland
R. W. Pittman
Inventor:
Addison H. Riggs,
By his Attorney.
F. H. Richards.

UNITED STATES PATENT OFFICE.

ADDISON H. RIGGS, OF ASBURY PARK, NEW JERSEY.

NUT-TAPPING MACHINE.

SPECIFICATION forming part of Letters Patent No. 678,813, dated July 16, 1901.

Application filed November 15, 1900. Serial No. 36,541. (No model.)

*To all whom it may concern:*

Be it known that I, ADDISON H. RIGGS, a citizen of the United States, residing in Asbury Park, in the county of Monmouth and State of New Jersey, have invented certain new and useful Improvements in Nut-Tapping-Machines, of which the following is a specification.

This invention relates to nut-tapping machines, and is in the nature of an improvement on that set forth in my Patent No. 662,965, dated December 4, 1900.

Primarily the object of the invention is the provision of improved means for centralizing the tap and for guiding the nut-blanks and finished nuts along the threading and delivery portions of said tap.

A further object of the invention is the provision, in connection with a tap, of peculiar construction, of a roller-guide for aiding the delivery of the finished nuts as they pass along the shank of said tap.

A further object of the invention is the provision, in connection with a tap, of a nut-blank driver extending along the shank of the tap and serving through the instrumentality of the nuts to centralize and properly sustain said tap.

A further object of the invention is the provision, in connection with a tap and a guide-rod or tube, upon which blanks are strung to be delivered to said tap, of means for lubricating the tap while doing its work.

A further object of the invention is the provision of a nut-blank driver having a feed device which will act upon the nuts and cause them positively to advance along the stem of the tap.

In the accompanying drawings, Figure 1 is a side elevation of my invention. Fig. 2 is a side elevation, partially broken away, of another form of the invention. Fig. 3 is a side elevation of one form of tap which may be employed, and Fig. 4 is a similar view of a modified form of tap. Fig. 5 is a bottom plan view of the nut-blank driver illustrated in Fig. 2, showing a thread or convolution on the under side of the driver.

Similar numerals designate like parts throughout the several views.

Referring to the drawings, the numeral 5 designates the frame of the machine, which may be in the form of a pedestal having a base-plate $5'$ and an enlarged portion $5^2$. Journaled in bearings 6 and $6'$ is a driving-shaft 7, carrying a pulley or other desired means for applying power (designated by the numeral 8.) At its inner end this driving-shaft is equipped with a pinion 9, shown as of the bevel variety, although it is distinctly to be understood that other gearing of any desired kind may be substituted therefor, if desired. Journaled in a lateral bearing 10 of an extension 12 of the enlarged part $5^2$ of the frame is a bevel, or it may be other, gear 13, having a sleeve $13'$, and fitted in and carried by this sleeve is a nut-blank holder or driver 14, having a flaring mouth $14'$. Designated by the numeral 15 is a tap having a deflected shank $15'$, and located in alinement with the working part of this tap is a preferably tubular feed-rod 16, fitted over a reduced upper portion $15^2$ of said tap and adapted to feed a lubricant thereto. Projecting from the frame 12 is a standard 17, and carried by this standard is a tank 18 for containing oil or other suitable lubricant, said tank having a spout $18'$, in a bearing $18^2$ of which is fitted the upper extremity of the tubular feed-rod, the supply of lubricant being regulated by a suitable valve $18^3$, as shown in Fig. 1. Journaled upon studs or pins 30 and $30'$ of the enlarged portion $5^2$ of the framework are rollers 20 $20'$, between which the deflected shank of the tap is supported, each of said rollers having a channeled periphery of a configuration suitable to fit the shape of the nuts as they pass along the shank of the tap. These devices constitute what I term a "roller-guide," and while but two rollers are shown it is distinctly to be understood that one or any desired number of rollers may be employed without departure from the invention and that this guide may be located where required. In the operation of this form of my invention nut-blanks 21 are strung upon the tubular feed-rod 16 and drop by gravity to the nut-blank driver 14, the flaring mouth $14'$ of which acts to guide them to, and the walls of the nut-blank holder or driver to centralize them upon, the tap. Here it may be mentioned that a series of these guiding rods or tubes 16 may be employed, if desired, the one in use when empty being replaced with a loaded rod, the ends of which are inserted in the bearing 18² of the spout 18' and over the reduced portion 15² of the tap, as illustrated in Fig. 1. This reduced portion is not absolutely essential, for the tube may be otherwise supported, if desired. In this way a continuous supply of nut-blanks may be provided, it only being necessary to replace an empty guide-rod by a loaded one to keep the machine in constant operation. Before commencing operations the tap is centralized and held in proper fixed position with relation to the nut-blank driver by placing nut-blanks or finished nuts upon the shank thereof where it is located adjacent to the roller-guide, and after this has been done the blanks as they fall by gravity from the feed-rod are received in the nut-blank driver, are slowly rotated around the tap, and are fed along by the thread thereof, dropping from said thread down the vertical portion of the shank until they enter the channel of the roller 20, by which they are guided along the curved or deflected portion of said shank and finally pass through the channeled periphery of roller 20' and off from the end of said shank. As shown, these rollers loosely rotate on the studs or pins 30 30'; but, if desired, they may be driven by any suitably-proportioned gearing to act as positive feed-guides for the nuts.

As illustrated in Figs. 1 and 4, the tap 15 and its shank 15' are formed in one integral piece. If desired, however, the tap may be made separate from the shank, as shown in Fig. 4, the tap being provided with a threaded stem 15³ of reverse pitch to that of its cutting-thread, which is inserted in an interiorly-threaded socket 15⁴ of the shank 15', so that there will be no danger of detaching said tap from its shank during the operation of the machine. In other words, if the thread of the tap be right-handed that of the shank will be left-handed, so that the rotation of the nut-blanks over and around the tap will have a tendency to tighten the same in its seat in the shank.

In the modification illustrated in Figs. 2 and 5 the nut-blank driver 14 is prolonged at 35 to extend for some distance along the shank 15' of the tap, the nuts thereon serving to centralize and support the tap in its concentric position with relation to said driver, and at its end the driver is outwardly flanged at 35' and has a flaring mouth, the inner wall of which is formed with a surface adapted positively to engage the nuts as the driver rotates and positively feed them along the shank 15' of the tap. While any suitable means for accomplishing this purpose may be employed, my invention not being limited in this respect, I prefer to employ a feed device of a spiral configuration, as illustrated at 36 in Figs. 2 and 5, the threads of which engage the nuts and serve as the driver rotates to advance them positively along the shank of the tap. In the form illustrated the thread or convolution is shown as having square shoulders 36', spaced apart from each other about the width of a nut, so that the thread will successively engage each nut and advance it positively on its way. In this form of the invention rollers 37 37' are employed, located one above the other and each having a channeled periphery to receive and conform to the configuration of the nuts, as in Fig. 1.

In both forms of the invention the tapping operation is carried out in precisely the same way, additional means being provided in Figs. 2 and 5 for positively advancing and also for supporting the nuts and through them centralizing the tap, and thus holding it in proper position.

Many changes may be made in the details of the invention, and it is not limited to the construction illustrated and described.

While the nut-blank driver is shown as a rotary device, it is obvious that said driver may be held stationary and the tap rotated therein without departing from the invention, and this reversal of the mode of operation is considered within the purview thereof. So, too, the gearing for rotating the nut-blank driver may be proportioned as desired and any suitable kind may be employed as a substitute for that shown.

Any suitable tap-lubricating device may be employed as a substitute for that shown.

No claim is made to the peculiar tap shown and described, for it constitutes the subject-matter of my contemporaneously-pending application, Serial No. 36,542.

Having thus described my invention, what I claim is—

1. In a nut-tapping machine, the combination, with a device in which the nut-blanks are received and a tap, the latter having a deflected shank, one of said parts being revoluble with relation to the other, of a roller-guide for directing the nuts along the shank of said tap.

2. In a nut-tapping machine, the combination, with a nut-blank driver of a tap passing through said driver and having a deflected shank, said nut-blank driver extending along the shank of the tap to and below the deflection of the same; and means for guiding the nuts along said shank.

3. In a nut-tapping machine, the combination, with a nut-blank driver, of a tap having a deflected shank; and means independent of the tap and nuts for positively feeding the nuts along said shank.

4. In a nut-tapping machine, the combination, with a nut-blank driver and a tap having a deflected shank, of a feeding device carried by the nut-blank driver; and a guide through which the nuts pass as they are discharged from the tap over said shank.

5. In a nut-tapping machine, the combination, with a nut-blank holder and a tap having a deflected shank, one of said parts being revoluble with relation to the other, of a device coöperating with said parts and serving to feed the nuts along said shank.

6. In a nut-tapping machine, the combination, with a tap having a deflected shank, of a nut-blank driver extending along said shank and having a feeding device for engaging the nuts.

7. In a nut-tapping machine, the combination, with a nut-blank driver, of a tap having a deflected shank, and rollers between which said shank passes.

8. In a nut-tapping machine, the combination, with a nut-blank driver having a helical surface at one end only, of a tap the shank of which extends through said driver; and a device for feeding nuts to said tap.

9. In a nut-tapping machine, the combination, with a nut-blank driver, of a tap having a reduced end and a deflected shank; a tube coöperating with said end; and means for supplying a lubricant to said tube.

10. In a nut-tapping machine, the combination, with a tap having a deflected shank, of a tube for supplying a lubricant to said tap and upon which tube the nut-blanks are strung; a nut-blank driver; and means for rotating said driver.

11. In a nut-tapping machine, the combination, with a tap having an extended shank, of a nut-blank driver for guiding and receiving the nut-blanks at both ends of said tap; and rollers for guiding the nuts as they pass along the shank of the tap.

12. In a nut-tapping machine, the combination, with a nut-blank driver having a long barrel, of a tap having a deflected shank and concentrically disposed in said barrel; and a roller-guide for sustaining said tap in position by the work being operated upon by the tap.

13. In a nut-tapping machine, the combination, with a tubular feed-rod upon which the blanks are strung, of means for supplying a lubricant to said rod; a tap having a deflected shank, the end of the tap being in line with the feed-rod; a nut-blank driver through which the tap is passed and having a barrel extending along a part of the deflected portion of the tap; and a guide for sustaining the tap in position by the work as it passes over said shank.

14. In a nut-tapping machine, the combination, with a tap having a vertical threading portion and a shank located at an angle to said threading portion, of a nut-blank driver; a tube on which the nut-blanks are strung, said tube being in alinement with the tap; means for supplying a lubricant to said tube; gearing for rotating the nut-blank driver; and rollers having channeled peripheries through which the shank of the tap passes, the nuts on said shank fitting in said peripheries and serving to centralize and support the tap.

15. In a nut-tapping machine, the combination, with a device in which the nut-blanks are received and guided, of a tap having a shank passing through said device; means for rotating one of said parts with relation to the other; and a roller having a channeled periphery for guiding the nuts as they pass along the shank of said tap.

16. In a nut-tapping machine, the combination, with a nut-blank driver, of a tap having a threaded stem reverse in pitch to that of its thread; a deflected shank having a threaded socket for receiving said stem; and means for supporting said shank.

17. In a nut-tapping machine, the combination, with a nut-blank driver of a tap located centrally therein, said tap having a threaded stem of reverse pitch to that of its thread; a deflected shank having a threaded socket to receive the stem of the tap; and means for supporting said shank.

18. In a nut-tapping machine, the combination, with framework, of a nut-blank driver journaled in a bearing of said framework; gearing for rotating the nut-blank driver; a tap having a reduced upper end and a shank located at an angle to said end; a tube fitted upon the reduced end of the tap; a tank for containing a lubricant and in communication with said tube, and means for simultaneously supporting the shank of the tap and guiding the nuts along the same.

19. In a nut-tapping machine, the combination, with a nut-blank driver and with gearing for rotating the same, of a tap having a deflected shank; a pair of rollers between which said shank passes; a tube on which nut-blanks are strung to be fed by gravital action to the tap; and a tank having a spout provided with a bearing for the reception of the upper end of said tube.

20. In a nut-tapping machine, the combination, with a tap having an extended shank, of a nut-blank driver having a long barrel shaped interiorly to receive and guide the nut-blanks and to rotate them around the tap, said nut-blank driver also having a flanged lower end with an internal helical surface; and means for supporting the tap and centralizing it within the nut-blank driver.

21. In a nut-tapping machine, the combination, with a nut-blank driver having a long barrel flared at its upper end and provided with a spiral surface at its lower end, of a tap having a deflected shank; and rollers for supporting said shank.

ADDISON H. RIGGS.

Witnesses:
HARRY M. ERVIEN,
RANDOLPH ROSS.